United States Patent [19]

Hutchison et al.

[11] 4,143,163

[45] Mar. 6, 1979

[54] COATED FIBROUS CELLULOSE PRODUCT AND PROCESS

[75] Inventors: Bruce R. Hutchison; Arthur M. Swanson, both of Madison, Wis.

[73] Assignee: Maxfibe, Inc., Palm Desert, Calif.

[21] Appl. No.: 772,101

[22] Filed: Feb. 25, 1977

Related U.S. Application Data

[63] Continuation-in-part of Ser. No. 701,147, Jun. 30, 1976, abandoned.

[51] Int. Cl.² .............................................. A23L 1/04
[52] U.S. Cl. ..................................... 426/96; 426/573; 426/456; 426/104; 426/804
[58] Field of Search ................. 426/96, 103, 302, 573, 426/658, 456, 804, 104

[56] References Cited

U.S. PATENT DOCUMENTS

| | | | |
|---|---|---|---|
| 2,714,083 | 7/1955 | Ferguson | 167/55 |
| 2,921,853 | 1/1960 | Card et al. | 426/651 |
| 3,023,104 | 2/1962 | Battista | 426/804 |
| 3,067,037 | 12/1962 | Herald et al. | 426/804 |
| 3,311,477 | 3/1967 | Segal | 426/302 |
| 3,360,374 | 12/1967 | Barr et al. | 426/804 |
| 3,574,634 | 4/1971 | Singer | 426/804 |
| 3,630,757 | 12/1971 | Meld | 426/589 |
| 3,867,560 | 2/1975 | Menzi | 426/804 |
| 3,881,024 | 4/1975 | Pahoundis, Sr. | 426/578 |

OTHER PUBLICATIONS

Glicksman, M., *Hydrocolloid Utilization in Fabricated Foods,* Cereal Foods World, vol. 21, No. 1, 1976, p. 17 et seq.

Scala, James, Fiber, *The Forgotton Nutrient,* Food Technology, Jan. 1974, p. 34 et seq.

*Primary Examiner*—Jeanette M. Hunter
*Attorney, Agent, or Firm*—Theodore J. Long; Harry C. Engstrom; Nicholas J. Seay

[57] ABSTRACT

An edible fibrous cellulose product encapsulated in a polyhydric alcohol and gum solution to produce a low calorie base product for the manufacture of foods. The encapsulation process consists of coating the surface of the fibrous cellulose material with the gum solution, containing polyhydric alcohol, then optionally drying the mixture to provide a free-flowing product.

30 Claims, No Drawings

COATED FIBROUS CELLULOSE PRODUCT AND PROCESS

This application is a continuation-in-part of U.S. application Ser. No. 701,147, filed June 30, 1976, now abandoned.

BACKGROUND OF THE INVENTION

1. Field of the Invention

This invention pertains generally to fibrous cellulose materials and their utilization as low calorie, bulking agents for manufactured foods and pharmaceuticals, and more specifically, to encapsulated fibrous cellulose particulates which have a smooth and pleasant mouth feel and can be incorporated as a low calorie, bulking agent in food compositions and pharmaceutical compositions to produce products of high palatability.

2. Description of the Prior Art

There is a long standing need in the United States and other Western countries for low calorie food products which may be consumed for pleasure or to satisfy one's hunger without contributing significantly to the daily caloric intake. A principal cause of such need has been the increasingly serious and wide-spread problem of obesity within our population, and the many health problems which are caused by or aggravated by obesity. In addition, many other persons, such as the diabetic, the pregnant, and persons suffering from particular conditions such as coronary arteriosclerosis and other conditions which are commonly considered to be partially due to the intake of excessive cholesterol and saturated fat have a need for low calorie foods, both nutritive and non-nutritive.

Recently, an increased amount of attention has been given to the lack of dietary fiber in the diet of people of the Western countries, including the United States. Modern food processing and preparation techniques and consumer tastes have substantially reduced the intake of the natural indigestible fiber or roughage contained in natural foods. Studies of more primitive cultures have observed a correlation between the high natural fiber content of the natural diets of such societies and the almost total absence of a variety of major and minor ailments common to modern Western societies, including constipation and colon cancer, obesity, varicose veins, diverticulosis, and heart disease. See e.g., David Ruben, M.D., the Save-Your-Life Diet, Random House, New York, 1975. Accordingly, the natural indigestible fibers are becoming recognized as an essential component of proper nutrition. The principal natural indigestible fiber contained in natural foods is cellulose.

In the past, efforts have been made to use conventional fibrous cellulose as a bulking agent in low calorie food compositions and in pharmaceuticals. Fibrous cellulose has the advantage, in addition to providing desirable dietary fiber, of providing desired bulk without calories. However, a principal defect of this material has been its objectionable texture. This characteristic has greatly limited the use of fibrous cellulose both in the field of food technology and the field of pharmaceutical preparations. When fibrous cellulose has been mixed according to conventional methods with other food ingredients, the fibrous cellulose is usually very noticeable to the taste, is not smooth, has a fibrous or gritty feel to the tongue and mouth when chewed, and tends to accumulate as an insoluble or residual material in the mouth. As a result, the food compositions themselves have tended to be rendered unpalatable by the addition of fibrous cellulose. Reduction of the fibrous cellulose content of such compositions to the point where it is not detectable when chewed has effectively reduced the proportion of fibrous cellulose to the point where it has no longer been effective as a bulking agent or a source of significant dietary fiber.

Recently, oleaginous fibrous simulated food products have been developed in which finely divided ground fibrous cellulose has comprised a major portion of the products on a dry-weight basis, with much improved palatability. However, when such products are formulated to simulate natural foods which have a smooth, creamy texture or which have a relatively bland flavor, the conventional fibrous cellulose particles are detectable and may be objectionable to some persons. In addition, the oil content of such oleaginous products may provide an undesirable source of substantial calories where a major objective is to provide a low calorie product.

Accordingly, the utilization of fibrous cellulose as a bulking agent and a source of dietary fiber in both foods and pharmaceuticals remains limited and largely unrealized due to the taste and texture characteristics of available fibrous cellulose materials. There thus remains an unsatisfied need for a low calorie bulking agent for food compositions, which is high in dietary fiber and which is smooth and highly palatable when chewed to permit its utilization in substantial amounts in food compositions simulating a substantial variety of natural foods and having a taste and texture which is similar to that of the natural food.

SUMMARY OF THE INVENTION

The coated or encapsulated fibrous cellulose base product of our invention consists of discreet particulate fibrous cellulose which is coated with a gum solution to provide a surface texture which is smooth and pleasant to the taste and which may be incorporated in natural and simulated food and pharmaceutical compositions without adversely affecting the palatability of the compositions.

The gum solution which we employ in our material consists of one or more gums or hydrocolloids in aqueous solution. The gum solution provides a coating around the fibrous cellulose particles which results in coated particles having the bulk and dietary fiber content of the fibrous cellulose, but the taste and texture of the gum solution. Accordingly, our gum coated fibrous cellulose may be incorporated into natural and simulated food compositions as a non-caloric constituent to add bulk and dietary fiber to the composition. In the composition, the gum coating imparts to the fibrous cellulose particles a smooth texture which is pleasant to the mouth and easy to chew and swallow. The gum coating substantially eliminates the dry and gritty surface texture and taste of the refined fibrous cellulose which may otherwise be apparent and unpleasant when consumed in its unmodified condition.

We have found that the palatability of our coated fibrous cellulose product is enhanced further if the gum solution also includes a quantity of a polyhydric alcohol (sometimes referred to as polyol). The polyol enhances the mouth feel or palatability of the gum coating and has a desirable effect on the tongue and other sensory receptors of the mouth which imparts a feeling of smoothness and moistness to the mouth, and which contributes to the palatability and pleasant texture of the coated fibrous cellulose within the mouth. The polyols also have a plasticizing effect on the gum coating which improves the mouth feel of the product during chewing. This characteristic imparts to the coated fiber a mouth feel which is substantially the opposite of the harsh, gritty texture of the untreated fibrous cellulose and other dietary fibers.

The process of encapsulating the particulate fibrous cellulose to produce our base food product may consist, alternatively, of applying the gum solution to the surface of the dry fibrous cellulose material, or mixing the fibrous cellulose into the gum solution, or dry mixing the gum and fibrous cellulose and blending the mixture into a water system, which may contain polyhydric alcohol. The process may additionally include the further step of drying the mixture to produce a dry, free flowing, finely divided product. Depending on the coating and drying steps employed, it may also be desirable to comminute the dry material to provide the characteristics desired in the dry product.

It is an object of the present invention to produce a modified fibrous cellulose product which provides all of the advantages of fibrous cellulose as a low caloric bulking agent and source of dietary fiber in simulated and natural food compositions and pharmaceuticals, and which has a smooth and pleasant texture and mouth feel to impart excellent palatability to food compositions in which it is used.

It is a further object of the present invention to produce a modified fibrous cellulose product which extends the utilization and acceptability of fibrous cellulose as a low calorie bulking agent and source of dietary fiber in food technology and pharmaceuticals.

It is an additional important object of the present invention to provide a readily available, palatable source of low caloric dietary fiber which may be extensively utilized as a bulking agent in natural and simulated foods and pharmaceuticals to improve modern diets.

It is another object of the present invention to provide a dry, particulate modified fibrous cellulose product having a soluble coating, which may be readily dispersed in aqueous solution to form a uniform, gel-like suspension of substantially uniform consistency and viscosity wherein the coated fibrous cellulose particles will not readily settle out or separate upon standing or centrifuging.

It is a still further object of the present invention to provide a modified fibrous cellulose produce of low caloric value which may be utilized in substantial proportions with other edible food materials of high, low or no nutritional value, including vitamins, minerals, proteins, carbohydrates, or pharmaceutical powder, to produce palatable products which may be easily swallowed without discomforting dryness.

Other objects and advantages of our invention will be apparent from the following detailed description of preferred embodiments of our coated fibrous cellulose products and the methods of producing such products, which exemplify the principles of our invention.

DESCRIPTION OF PREFERRED EMBODIMENT

As indicated above, our encapsulated fibrous cellulose food base product consists of separated cellulose fibers which are coated by or encapsulated within a gum solution. Fibrous cellulose is found in such natural materials as wood, cotton, grains, and other vegetable materials, and under proper conditions and with proper treatment may be utilized as a component of natural and simulated food products and pharmaceuticals. The cellulose should be in the form of separated cellulosic fibers, with substantially all of the binding material between the fibers, such as lignin and pectin, removed in order to provide as bland a material as possible which will not contribute substantially to the flavor of the final product. An example of a satisfactory cellulose fiber for our product is wood pulp which has been digested by either the well known sulphate or sulphite process to remove the binders. The resulting cellulose fiber is then washed and cleansed to remove any traces of extraneous chemicals, and mechanically ground to reduce the fibers down to a small average size within the range of about 20 to 40 microns or less in length. We have found that such particles when gum coated according to our invention may be chewed and swallowed without any substantial harsh or gritty mouth feel, and without apparent residual dryness, accumulation in the mouth, or undesirable aftertaste.

One commercially available source of particulate fibrous cellulose satisfactory for use in our encapsulated food product is obtained from the Brown Company of Berlin, New Hampshire, under the trade name SOLK-A-FLOC BW-300. This particulate fibrous cellulose, also known as powdered cellulose, is a mechanically disintegrated and purified cellulose generally obtained from primarily alpha cellulose derived from wood pulp. 99.5% of this material will pass through a 33-micron screen and 99.0% will pass through a 23-micron screen. The average fiber length is 21 microns and the average fiber width is 17 microns. Such relatively fine powdered cellulose as SOLKA-FLOC BW-300, or an equivalent finely powdered cellulose, will provide cellulose fiber which may be treated according to our method to produce a non-caloric, palatable bulking agent.

The gum solution which is used to coat or encapsulate the fibrous cellulose particles in our product consists of one or more gums or hydrocolloids in aqueous solution, and may also preferably include a polyhydric alcohol. The gums which we have found to be particularly advantageous in our product are high viscosity, sodium carboxymethylcellulose (CMC), Guar gum, locust bean gum, xanthan gum and alginates. These gums when mixed with water in low concentrations form thick, heavy pastes. When the previously described fibrous cellulose is intimately mixed with the gum paste, the paste forms a relatively thick coating on the particles of fibrous cellulose which will be retained on the particles during drying and/or further processing. It should be noted that the thick, heavy pastes which are obtained with the above listed gums, although gel-like in appearance, need not be true gels, as in the case of CMC, Guar gum, locust bean gum and xanthan gum, or may be true gels, as in the case of alginates. The list of gums set forth above is representative only, and other gums or combinations of gums which have the ability to form heavy pastes which will coat and remain adhered to the fibrous cellulose particles through drying and further processing may also be utilized with our process and product.

The polyhydric alcohol, or polyol, which is preferably incorporated in our gum solution to further enhance the palatability of our coated fibrous cellulose product, includes the following polyols that are currently approved for use in foods — glycerol, sorbitol, propylene glycol and mannitol. Of these polyols, we have found glycerol, commonly called glycerine, to be particularly advantageous and preferred. Depending on the intended end use application of our coated fibrous cellulose product, either of the others or combinations of two or more of the polyols may be found to most advantageously impart the desired mouth feel to the coated fibrous cellulose.

The following examples are provided as illustrative of the products and processes of our invention, but it is understood that the invention is not limited to the specific details thereof.

EXAMPLE I

A coated fibrous cellulose product was prepared from the following ingredients:

| INGREDIENT | QUANTITY |
|---|---|
| Water | 565.4 gm. |
| Sodium Carboxymethylcellulose (7HCF Hercules) | 7.1 gm. |
| Guar Gum | 9.4 gm. |
| Glycerine | 64.8 gm. |
| SOLKA FLOC BW 300 | 353.3 gm. |
| Total | 1,000.0 gm. |

All of the water was heated to 170°–180° F. The gums, consisting of sodium carboxymethylcellulose (CMC) and Guar gum, were then blended together. Approximately 475 grams of the heated water were placed in a Waring blender, followed by the glycerine and the blended gums, and the materials were blended to form a thick, heavy gel-like paste coating solution as the mixture solubilized. The SOLKA FLOC BW 300 fibrous cellulose was then placed in a Hobart mixing bowl equipped with a flat beater. The thick, heavy coating solution was poured into the same mixing bowl and the beater turned on at low speed to mix and knead the mass.

The remaining hot water was then poured into the Waring blender bowl to rinse out the remaining gum solution and this rinse water was poured into the Hobart mixing bowl. The speed of the Hobart beater was increased to medium agitation to avoid build-up on the beater blades and aid in mixing and kneading the mass.

When the mass was intimately and thoroughly mixed, it was spread on a drying pan and dried with occasional agitation at a temperature of approximately 220° F. until it was a dry, free flowing granulated product. The granulated product mass was then comminuted by grinding to produce a desired finely divided, free flowing product.

A microscopic examination of the product revealed that the fibrous cellulose particles were coated or encapsulated by the dried gum solution. When placed in the mouth, the product effected a smooth and palatable mouth feel, with desirable moistness. When chewed and swallowed the product retained its desirable mouth feel, did not accumulate or leave a residue in the mouth, and left no undesirable aftertaste. The taste and mouth feel of the product appeared to be that imparted by the gum solution coating of the particles, with the fibrous cellulose particles themselves contributing their bulk only to the mouth sensation.

EXAMPLE II

A coated fibrous cellulose product was prepared from the following ingredients:

| INGREDIENTS | QUANTITY |
|---|---|
| Water | 534.4 gm. |
| Sodium Carboxymethylcellulose (7HCF Hercules) | 4.7 gm. |
| GFS* | 6.9 gm. |
| Glycerine | 63.3 gm. |
| SOLKA FLOC BW 300 | 390.7 gm. |
| Total | 1,000.0 gm. |

*GFS is the brand name of Kelco Company, San Diego, California, for a blend of xanthan gum, locust bean gum, and Guar gum.

The above ingredients were subjected to all of the steps set forth in Example I above, the GFS gum blend being employed in the same manner as the Guar gum alone in Example I. The resulting product exhibited substantially the same structure and properties as the product of Example I.

EXAMPLE III

A coated fibrous cellulose product was prepared from the following ingredients:

| INGREDIENTS | QUANTITY |
|---|---|
| Water | 800 gm. |
| Sodium Carboxymethylcellulose (CMC) (7HCF Hercules) | 5.5 gm. |
| GFS | 3.9 gm. |
| SOLKA FLOC BW 300 | 300 gm. |
| Total | 1109.4 gm. |

The above ingredients were subjected to all of the steps set forth in Example I above, the GFS gum blend and CMC providing all of the gum content of the gum solution. The resulting product consisted of fibrous cellulose particles coated or encapsulated by the dried gum solution, with no polyhydric alcohol content. When placed in the mouth, the product effected a smooth and palatable, slightly dry mouth feel. When chewed and swallowed the product retained its desirable mouth feel, did not accumulate or leave a residue in the mouth, and left no undesirable aftertaste. The taste and mouth feel of the product was similar to the taste and mouth feel of the gums themselves.

Other equivalent methods may be employed to physically coat the fibrous cellulose particles with the gum solution. For example, we have found that gum solutions of the type described in the examples may be diluted with the addition of water until the gum solution is sprayable through conventional spraying equipment. The gum content of such solutions will usually be between approximately 0.25 and 0.5%, although the particular gum content may be varied to provide the best spray performance with the particular spray equipment being utilized. The sprayable gum solution may then be applied in accordance with well known air suspension, fluidized bed coating processes, in which the particles to be coated are held in suspension by an upwardly flowing gas (e.g. air) stream in a coating chamber to form a bed of gas-suspended particles. The coating material, in atomized or like finely divided form, should be sprayed onto the gas-suspended particles in a continuous manner until the particles have acquired the desired coating of gum solution. The upwardly flowing gas which holds the particles in suspension also causes the particles to be dried, and if desired, the particles may be maintained in suspension after leaving the spraying zone to provide further drying as desired, in accordance with conventional fluidized bed coating techniques. One such process and apparatus for coating particles in a fluidized bed is illustrated and described in Lindlof et al., U.S. Pat. No. 3,117,027. Many other processes and apparatus for coating particles in a fluidized bed are well known.

Particles which are coated by mechanically mixing the fibrous cellulose with the heavy, paste-like gum solution or other less viscous gum solutions may also be dried on a fluidized bed drier, for example, in accordance with the method of wetting and drying particles set forth generally in Gidlow et al., U.S. Pat. No. 3,248,228, or other well known commercial processes and apparatus.

We have found that a particularly advantageous method of obtaining a dry, finely divided free-flowing gum coated fibrous cellulose product in accordance with our invention utilizes the process of spray drying. Our spray drying process is exemplified by the following example.

EXAMPLE IV

A dry, finely divided free-flowing gum coated fibrous cellulose product was prepared from the following ingredients:

| INGREDIENTS | QUANTITY | | PERCENT |
|---|---|---|---|
| SOLKA FLOC BW 300 | 150.00 | lbs. | 79.8% |
| Glycerine | 33.00 | lbs. | 17.5% |
| GFS | 2.45 | lbs. | 1.3% |
| Sodium Carboxymethylcellulose (7HCF Hercules) | 2.63 | lbs. | 1.4% |
| Total | 188.08 | lbs. | 100.0% |

A 200 gallon vat was filled to one-third its volume with water. The water was heated to 185° F. and all of the glycerine was added to the hot water. The CMC and the GFS gums were dry blended with the SOLKA FLOC fibrous cellulose and the dry blend was added gently to the water-glycerine system. Additional water was added to keep the mixture in the vat at the consistency of a thin paste. The temperature was maintained at about 185° F. and the mixture was stirred to break up any lumps that formed. Total material in the vat was approximately 180 gallons, with the non-water ingredients comprising about 20–25% of the material, which was smooth and pumpable.

The material was then subjected to spray drying in a conventional tower spray dryer, equipped with a bustle at the base using a single nozzle 57/27 type SX (Spraying Systems, Inc., Wheaton, Illinois) spray nozzle, with a pump pressure to nozzle of 500 psi. The air inlet temperature to the spray dryer was 310° F., and the air outlet temperature was approximately 183°–187° F.

Approximately 44% of the dry material from the dryer was discharged from the center, with the remaining 56% recovered from the cyclones. The material was finally divided, free-flowing and non-hygroscopic. When the treated material was left in the open for a few days it did not cake. Under microscopic examination in comparison with the untreated fibrous cellulose the final product was revealed to consist of the fibrous cellulose particles coated with the dried gum-glycerine solution. When placed in the mouth, the product effected a smooth and palatable mouth feel, with desirable moistness. When chewed and swallowed the product retained its desirable mouth feel, did not accumulate or leave a residue in the mouth, and left no undesirable aftertaste. The taste and mouth feel of the product appeared to be that imparted by the gum and glycerine, with the fibrous cellulose particles themselves substantially contributing only their bulk to the mouth sensation.

The coated product, when introduced into water, was readily wetted and quickly dispersed in the water upon stirring to form a smooth gel-like suspension. The suspension did not stick to the sides of the container above the liquid level, but quickly drained down the sides into the main body of the suspension. Upon standing there was no significant settling out of powder on the bottom of the container nor any observable water separation at the top of the liquid. The coated powder appeared to be uniformly and smoothly distributed within the gel-like suspension, with the gum coating reacting with ("locking up") the water to produce the suspension. The suspension demonstrated excellent stability which was further substantiated by subjecting the suspension to centrifugation. 15 grams of our spray dried product was mixed with 60 grams of water (25° C.) for 5 seconds at low speed in a Waring blender, and the resultant mixture was poured into a 50 ml conical centrifuge tube. The contents of the tube were centrifuged for 3 minutes at 1600 rpm in a centrifuge having a 16 inch diameter head. The tube was removed and observed. The coated cellulose remained in uniform suspension with only slight cloudy water separation. No significant sludge or precipitate was found at the bottom of the tube.

Our dried gum coated fibrous cellulose particulate products are characterized by their ability to be readily dispersible in water to form stable, uniform gel-like suspensions of variable viscosity depending upon the proportion of dry product to water. Our non-dried gum coated fibrous cellulose products will also form a stable, uniform gel-like suspension in aqueous systems, and this characteristic makes it possible to utilize our dry and wet products in the simulation of foods of various viscosities.

While drying and comminuting steps have been described and are desirable where our product will be held, stored and/or shipped for various subsequent end product utilizations, such steps are not required where our product is utilized directly in a continuing formulation process. Thus where our product is to be used as a low-calorie bulking agent in a simulated food product, for example, our product may be mixed with additional ingredients as soon as the gum solution has been completely applied to the fibrous cellulose particles. The excess moisture in the gum solution may then supply some of the moisture required in the final simulated food product, or may be removed subsequently during drying of the final simulated food product, if desired. Accordingly, drying and comminuting are not essential to our process or product.

The utility of our gum coated fibrous cellulose material, both in the dry and in the paste form, is illustrated by the following examples:

EXAMPLE V

A fat free, low calorie, simulated sour cream dip product was prepared from the following ingredients:

| INGREDIENTS | QUANTITY |
|---|---|
| Gum Coated Fibrous Cellulose Product of Example IV | 325 gm. |
| Sodium Chloride | 15 gm. |
| Potassium Sorbate | 3 gm. |

| INGREDIENTS | QUANTITY |
| --- | --- |
| *-continued* | |
| Spray Dried Artificial Sour Cream Flavor (FMC 14857) | 3 gm. |
| Lactic Acid | 6 gm. |
| Citric Acid | 1.2 gm. |
| Gelatin | 1 gm. |
| Water | 1145.8 gm. |
| Total | 1500.0 gm. |

All of the water was heated to approximately 185° F. Approximately 55 to 60% of the hot water was then added to the dry, coated fibrous cellulose product in a Hobart mixer and whipped until smooth and homogeneous. The remaining ingredients were then added to the remaining water in a Waring blender, and then the material in the Waring blender was added to the mixture of coated fibrous cellulose and water in the Hobart mixer and beaten until smooth and homogeneous. The product was then refrigerated.

The simulated sour cream dip product so prepared had a body and texture which simulated conventional sour cream, but had no fat, had a very low calorie content, and a very substantial fibrous cellulose content of about 17% on a total weight basis, and about 73% of the non-water ingredient. The consistency was similar to conventional sour cream dip, being rather heavy bodied, spoonable and spreadable, as well as substantially shape retaining when deposited on a flat surface.

EXAMPLE VI

A low calorie, simulated mayonnaise product was prepared from the following ingredients:

| INGREDIENTS | QUANTITY |
| --- | --- |
| SOLKA FLOC BW 300 | 240 gm. |
| Glycerine | 45 gm. |
| Mannitol | 15 gm. |
| Propylene Glycol Alginate (Kelco HVF) | 3 gm. |
| Xanthan Gum | 4.5 gm. |
| Sodium Carboxymethylcellulose (CMC) (7HCF Hercules) | 2 gm. |
| Guar Gum | 2 gm. |
| Vinegar | 8 gm. |
| Citric Acid | .5 gm. |
| Sodium Chloride | 3 gm. |
| Potassium Sorbate (Sorbitol K) | 3 gm. |
| Imitation Mayonnaise Flavor (FMC 5-5-1.7) | 100 gm. |
| Titanium Dioxide | .4 gm. |
| Egg Shade Color (FMC 587) | .02 gm. |
| Water | 1090 gm. |
| Total | 1516.42 gm. |

500 millileters of the water was heated to 170°–180° F. All of the glycerine was added to the hot water and uniformly mixed therein. The xanthan gum, CMC and Guar gum were then mixed into the solution, followed by the SOLKA FLOC fibrous cellulose which was added slowly to the solution and mixed until smooth. Approximately 5 minutes was consumed by the mixing of the fibrous cellulose. At this point the fibrous cellulose particles were thoroughly coated with the gum-glycerine solution.

All of the other ingredients, which were selected for the purpose of simulating the flavor, color and texture of mayonnaise, were then mixed with the remaining water, and that mixture was then added to the mixture of fibrous cellulose, gum, glycerine and water and mixed until smooth. The product was then refrigerated.

The simulated mayonnaise product so prepared had a body and texture which simulated conventional mayonnaise, but had no fat, had a very low calorie content and a very substantial fibrous cellulose content of about 15.8% on a total weight basis, and about 56% of the non-water ingredients. The consistency was similar to conventional mayonnaise, being rather medium bodied, spoonable and spreadable.

EXAMPLE VII

A low calorie, simulated margarine product was prepared from the following ingredients:

| INGREDIENTS | QUANTITY |
| --- | --- |
| SOLKA FLOC BW 300 | 310 gm. |
| Glycerine | 45 gm. |
| CMC (Hercules 7HCF) | 5 gm. |
| CMC (Hercules 7HMCF) | 5 gm. |
| Guar Gum | 2 gm. |
| Xanthan Gum | 3.8 gm. |
| Carrageenan | .8 gm. |
| Sodium Chloride | 17 gm. |
| Potassium Chloride | 14 gm. |
| Potassium Sorbate | 3 gm. |
| Citric Acid | 1.2 gm. |
| Mannitol | 15 gm. |
| Sorbitol (Powdered) | 5 gm. |
| Egg Shade Color (FMC 587) | .07 gm. |
| Artificial Butter Flavor (Firmenich 57.390/A) | 5 gm. |
| Water | 1070 gm. |
| Total | 1501.87 gm. |

The above ingredients were subject to all of the steps set forth in Example VII above, the CMC's, guar gum and xanthan gum together with glycerine providing the coating for the fibrous cellulose, with the remaining ingredients being selected for their contribution to flavor, color and texture of the final product. The simulated margarine product was substantially fat free, containing no oil or other source of substantial fat. The product had a smooth, uniform consistency similar to soft spreadable margarine. When placed on the tongue, the simulated margarine product appeared to "melt in the mouth" and was very smooth and palatable.

It should be noted that the products of Examples V, VI, and VII constitute palatable, simulated food products which are substantially fat free. No oil or other sources of fat are required when formulating smooth, palatable simulated foods containing substantial percentages of fibrous cellulose. Accordingly, the calorie content of the fat free simulated food products of our invention is extremely low, inasmuch as the only sources of fat are the various ingredients which are employed in relatively minor amounts to provide the desired flavor, color and texture qualities in the final product.

It should also be noted that the products of Examples V, VI and VII include no significant protein, and only very low amounts of carbohydrate supplied principally by the polyhydric alcohol constituents. Accordingly, our described simulated food products do not contain the calories normally supplied by proteins and more concentrated sources of carbohydrates. Although others may desire to incorporate fats, proteins and carbohydrates in food products or simulated food products containing products produced in accordance with our invention, such additional calorie containing materials are not required to provide a palatable source of fibrous cellulose and palatable simulated foods containing such fibrous cellulose. Thus, the simulated foods which may be made from our gum coated fibrous cellulose product provide a high level of palatable fiber and an extremely low level of calories.

In Examples V, VI and VII, the sodium chloride, potassium chloride, lactic acid, citric acid, vinegar, spray dried artificial sour cream flavor (FMC 14857), imitation mayonnaise flavor (FMC 5-5-1.7) and artificial butter flavor (Firmenich 57.390/A) are examples of materials which may be referred to as flavoring agents. Egg shade color (FMC 587) and titanium dioxide are examples of materials which may be referred to as coloring agents. Carrageenan, gelatin and propylene glycol alginate as used in the said Examples, may be referred to as texturizing agents. Where the food product to be simulated has a solid form, such as cheese, the gelatin, sodium alginate or other texturizing agents capable of forming a cohesive gel may be included in sufficient quantity and subjected to known gel inducing conditions, including temperature adjustment or, in the case of sodium alginate, the addition of reagents such as calcium salts, to form a uniform cohesive gel which simulates the body of the selected food product to be simulated.

Although the emphasis in the above discussion has purposefully been directed to the coating of individual cellulose fiber particles with a gum solution, it is obvious and inherent in the examples and processes described that the coated particles will sometimes tend to agglomerate or stick together in groups of two or more coated particles so that the coated product will be in a granulated or in some cases, lumpy condition, prior to or subsequent to drying. It should also be understood that a single particle of gum coating may incapsulate a plurality of randomly oriented fibrous cellulose particles. Where the final dry product is desired to be in a finely divided form, the product may be comminuted by, for example, mechanical grinding in a conventional manner to obtain the desired finely divided product. We have found that the gum coating will remain adhered to the fibrous cellulose particles even after being subjected to reasonable grinding action.

The amount of gum which is required to provide an effective gum coating on the particulate cellulose material is at least about 1 part gum to 50 parts particulate fibrous cellulose, by weight, or 2%. Lesser amounts of gum will not impart the degree of smoothness and palatability to the fibrous cellulose required to achieve the advantages of our invention, and will not provide a product which will form a uniform, stable gel-like suspension in water. The amount of gum to be used will depend in each instance upon the particular gums and the particular fibrous celluloses which are used, as well as the intended end use of the product. We have found that gum to cellulose ratios of between about 1 to 35 and 1 to 20 will produce gum coatings on the fibrous cellulose particles of satisfactory thickness to impart the desired properties of improved smoothness and palatability to the particulate fibrous cellulose. Gum to cellulose ratios as high as 1 to 10 and higher may be employed where it is desired to produce a product having a relatively high gum content. The maximum desired gum content would be approximately 15% of the fibrous cellulose content, by weight, as higher percentages of gum produce an excessively sticky, gummy product which is difficult to handle and has undesirable palatability characteristics.

The ratio of polyhydric alcohol (polyol) to edible gum may be varied substantially, from no polyol whatever, as in Example III, above, to at least 12 parts polyol to 1 part gum. The particular effects of the polyol appear negligible at ratios of less than about 2 to 1, and the beneficial effects of the polyol appear to be optimized at ratios of from 4 to 1 to about 6.5 to 1.

We have found that the particulate fibrous cellulose which may be advantageously utilized in our process and products may have an average fiber length of up to 75 microns and still be rendered palatable by our process. Material of that average size is more suitable for use in baked goods or other products having a fairly coarse texture. Where more smoothness and palatability is desired, particulate fibrous cellulose having an average length of not more than 40 microns is preferable, and a still smaller average particle length in the area of approximately 20 microns is highly desirable, particularly where the product may be used to simulate smooth, bland foods.

We have also found that an emulsifier may be advantageously added to our coating solution to impart the characteristic of the emulsifier to our product. The addition of an emulsifier has been found to provide some of the same characteristics of improved palatability which are provided by polyhydric alcohols. In some cases, if polyhydric alcohol is not desired in the final product, an emulsifier may be substituted therefor to produce a product similar to that including polyhydric alcohol, but slightly drier to the tongue. An example of a suitable emulsifier is triglycerol monostearate (TRIODAN 55, Grindsted Products, Inc.). Certain polyoxyethylene sorbitan esters such as Tween 60 and Tween 80 are also suitable. The preferred ratio of emulsifier to edible gum in the coating solution is between about 1 to 1 and 1 to 1.5. The use of such an emulsifier additionally imparts the characteristics of the emulsifier to the product when the product is combined with other aqueous and non-aqueous systems.

As previously indicated, the gum coated fibrous cellulose base product of our invention has many applications for which the uncoated fibrous cellulose is not suited. Such applications are found in the simulated food and fortified food fields where it is desired to utilize fibrous cellulose as a bulking agent or a source of dietary fiber without introducing material which is unpalatable or otherwise contributes to reduced palatability of the final product, and in pharmaceutical products where, for example, a carrier having a smooth, moist mouth feel which may be swallowed without discomforting dryness is desired.

Our gum coated fibrous cellulose base product may itself be utilized for direct human consumption as a low calorie, concentrated source of dietary fiber, for example, by forming our product into gum coated pills or capsules containing substantial amounts of dietary fiber in accordance with known pharmaceutical practices.

It is understood that our invention is not confined to the particular embodiments described herein, but embraces all such modified forms thereof as may come within the scope of the following claims.

We claim:

1. A low calorie edible fibrous cellulose product for human consumption, consisting essentially of:
   (a) particulate fibrous cellulose having an average particle length of less than about 75 microns, and
   (b) a soluble coating of soluble edible gum and polyhydric alcohol adhered to the surfaces of the particulate fibrous cellulose to provide a soluble, smooth, and palatable surface texture to the product, the amount of edible gum being between about 2% and 15% of the fibrous cellulose, the proportion of polyhydric alcohol to edible gum being between about 2 to 1 and 12 to 1, the coated fibrous cellulose being dispersible in water to form a stable, gel-like suspension of uniform viscosity.

2. The coated fibrous cellulose product of claim 1 wherein the product is dispersed in water in a stable, uniform gel-like suspension of uniform viscosity.

3. The coated fibrous cellulose product of claim 1, wherein the edible gum comprises at least one gum selected from the group consisting of sodium carboxymethylcellulose, guar gum, xanthan gum, locust bean gum and alginates.

4. The coated fibrous cellulose product of claim 1 wherein the polyhydric alcohol is selected from at least one of the group consisting of glycerol, sorbitol, propylene glycol and mannitol.

5. The coated fibrous cellulose product of claim 1 wherein the polyhydric alcohol is glycerol.

6. A fat-free, low calorie, simulated food product for human consumption, consisting essentially of:
(a) particulate fibrous cellulose having an average particle length of less than about 75 microns,
(b) a soluble coating of soluble edible gum and polyhydric alcohol adhered to the particles of fibrous cellulose, the amount of said edible gum being between about 2% and 15% of the weight of the fibrous cellulose, the proportion of polyhydric alcohol to edible gum being between about 2 to 1 and 12 to 1,
(c) water in an amount selected to simulate the viscosity of a selected food product,
(d) said coated fibrous cellulose being a stable suspension of uniform viscosity in the water wherein the coated fibrous cellulose is uniformly distributed therethrough,
(e) at least one flavoring agent mixed with the suspension to simulate the flavor of the selected food product, and
(f) at least one texturing agent mixed with the suspension to simulate the texture of the selected food product.

7. A fat-free, low calorie, simulated food product for human consumption, consisting essentially of:
(a) particulate fibrous cellulose having an average particle length of less than about 75 microns,
(b) a soluble coating of soluble edible gum adhered to the particles of fibrous cellulose, the amount of said edible gum being between about 2% and 15% of the weight of the fibrous cellulose, the soluble edible gum coating additionally including a polyhydric alcohol, the proportion of polyhydric alcohol to edible gum being between about 2 to 1 and 12 to 1,
(c) water in an amount selected to simulate the viscosity of a selected food product,
(d) said coated fibrous cellulose being a stable suspension of uniform viscosity in the water wherein the coated fibrous cellulose is uniformly distributed therethrough,
(e) at least one flavoring agent mixed with the suspension to simulate the flavor of the selected food product.

8. The simulated food product of claim 7 wherein at least one texturizing agent is mixed with the suspension to simulate the flavor of the selected food product.

9. The coated fibrous cellulose product of claim 7 wherein the polyhydric alcohol is selected from at least one of the group consisting of glycerol, sorbitol, propylene glycol and mannitol.

10. The coated fibrous cellulose product of claim 7 wherein the polyhydric alcohol is glycerol.

11. A fat-free, low calorie, simulated food product for human consumption, consisting essentially of:
(a) particulate fibrous cellulose having an average particle length of less than about 75 microns,
(b) a soluble coating of soluble edible gum and polyhydric alcohol adhered to the particles of fibrous cellulose, the amount of said edible gum being between about 2% and 15% of the weight of the fibrous cellulose, the proportion of polyhydric alcohol to edible gum being between about 2 to 1 and 12 to 1, the soluble coating additionally including an emulsifier,
(c) water in an amount selected to simulate the viscosity of a selected food product,
(d) said coated fibrous cellulose being a stable suspension of uniform viscosity in the water wherein the coated fibrous cellulose is uniformly distributed therethrough, and
(e) at least one flavoring agent mixed with the suspension to simulate the flavor of the selected food product.

12. A process for producing a fat-free, low calorie, edible coated fibrous cellulose product for human consumption, comprising the steps of:
(a) mixing at least one soluble edible gum and polyhydric alcohol in water to produce a gum solution, the proportion of polyhydric alcohol to edible gum being between about 2 to 1 and 12 to 1; and
(b) mixing particulate fibrous cellulose having an average particle length of less than about 75 microns with said gum solution to substantially completely coat the surfaces of the fibrous cellulose particles with the gum solution whereby the coated product acquires the surface texture of the gum solution coating, the amount of edible gum being between about 2% and 15% of the weight of the fibrous cellulose, the product being in stable gel-like suspension of uniform viscosity.

13. The process of claim 12 including the additional step of drying the coating of gum solution on the cellulose particles to provide a dry product having a soluble, palatable surface texture.

14. The process of claim 12 including the additional step of comminuting the dried product to produce a finely divided, free flowing product.

15. The process of claim 12, wherein the soluble edible gum comprises at least one gum selected from the group consisting of sodium carboxymethylcellulose, guar gum, xanthan gum, locust bean gum and alginates.

16. The process of claim 12, wherein the polyhydric alcohol is selected from at least one of the group consisting of glycerol, sorbitol, propylene glycol and mannitol.

17. The process of claim 12, wherein the polyhydric alcohol is glycerol.

18. A process for producing a low calorie, edible coated fibrous cellulose product for human consumption, comprising the steps of:
(a) mixing at least one soluble edible gum and polyhydric alcohol with water to produce a gum solution, the proportion of polyhydric alcohol to edible gum being between about 2 to 1 and 12 to 1,
(b) mixing particulate fibrous cellulose having an average particle length of less than about 75 microns with the gum solution to substantailly completely coat the surfaces of the fibrous cellulose articles with the gum solution, the edible gum being between about 2% and 15% of the weight of the fibrous cellulose, the amount of water being sufficient to permit pumping and spraying of the mass, (c) spray drying the mass to produce dry, finely divided soluble gum coated fibrous cellulose particles which are free flowing and dispersible in water to produce a stable gel-like suspension of uniform viscosity.

19. The process of claim 18, wherein the edible gum comprises at least one gum selected from the group consisting of sodium carboxymethylcellulose, guar gum, xanthan gum, locust bean gum and alginates.

20. The process of claim 18, wherein the polyhydric alcohol is selected from at least one of the group consisting of glycerol, sorbitol, propylene glycol and mannitol.

21. The process of claim 18, wherein the polyhydric alcohol is glycerol.

22. The process of claim 18 wherein a fat free, low calorie simultated food product is produced by:
(a) dispersing the spray dried product in sufficient water to produce a stable gel-like suspension having a uniform viscosity which simulates the viscosity of a selected food product, and
(b) mixing at least one flavoring agent with the suspension to simulate the flavor of the selected food product.

23. The process of claim 22 wherein at least one coloring agent is mixed with the suspension to simulate the color of the selected food product.

24. The process of claim 22 wherein at least one texturizing agent is mixed with the suspension to further simulate the texture of the selected food product.

25. The process for producing a low calorie, edible fibrous cellulose product for human consumption, comprising the steps of:
(a) dry blending at least one soluble edible gum with particulate fibrous cellulose, the amount of the edible gum being between about 2% and 15% of the weight of the fibrous cellulose,
(b) mixing a polyhydric alcohol with heated water, the proportion of the polyhydric alcohol to the edible gum being in the ratio of between about 2 to 1 and 12 to 1,
(c) mixing the dry blend of edible gum and fibrous cellulose into the water and polyhydric alcohol solution and mixing until smooth to substantially completely coat the particulate fibrous cellulose with an edible gum solution, and
(d) drying the coated fibrous cellulose to provide a soluble, smooth and palatable surface coating on the particulate fibrous cellulose.

26. The process of claim 25, wherein the water and polyhydric alcohol solution is heated to approximately 175° to 185° F. and the materials are maintained at that temperature until subjected to drying.

27. The process of claim 25, wherein the drying step is carried out in a spray drier.

28. A process for producing a fat-free, low calorie, simulated food product for human consumption, consisting essentially of:
(a) mixing at least one soluble edible gum and polyhydric alcohol in water to produce a gum solution, the proportion of polyhydric alcohol to edible gum being between about 2 to 1 and 12 to 1,
(b) mixing particulate fibrous cellulose with the gum solution to substantially completely coat the surfaces of the fibrous cellulose particles with the gum solution, the edible gum being between about 2% and 15% of the weight of the fibrous cellulose, the amount of water being sufficient for the coated fibrous cellulose to form a stable suspension in the water wherein the coated fibrous cellulose is uniformly distributed therethrough, and for the viscosity of the suspension to simulate the viscosity of a selected food product, and
(c) mixing at least one flavoring agent with the suspension to simulate the flavor of the selected food product.

29. The process of claim 28 wherein at least one coloring agent is mixed with the suspension to simulate the color of the selected food product.

30. A process for producing a fat-free, low calorie, simulated food product for human consumption, consisting essentially of:
(a) mixing at least one soluble edible gum and polyhydric alcohol in water to produce a gum solution, the proportion of polyhydric alcohol to edible gum being between about 2 to 1 and 12 to 1,
(b) mixing particulate fibrous cellulose with the gum solution to substantially completely coat the surfaces of the fibrous cellulose particules with the gum solution, the edible gum being between about 2% and 15% of the weight of the fibrous cellulose, the amount of water being sufficient for the coated fibrous cellulose to form a stable suspension in the water wherein the coated fibrous cellulose is uniformly distributed therethrough, and for the viscosity of the suspension to simulate the viscosity of a selected food product,
(c) mixing at least one flavoring agent with the suspension to simulate the flavor of the selected food product, and
(d) mixing at least one texturizing agent selected from the group consisting of carrageenan, gelatin, propylene glycol alginate and sodium alginate with the suspension.

* * * * *